United States Patent
Oke et al.

(10) Patent No.: US 9,423,645 B2
(45) Date of Patent: Aug. 23, 2016

(54) LIQUID CRYSTAL DISPLAY DEVICE

(71) Applicant: Panasonic Liquid Crystal Display Co., Ltd., Himeji-shi, Hyogo (JP)

(72) Inventors: Ryutaro Oke, Osaka (JP); Keiichirou Ashizawa, Osaka (JP); Hiroaki Iwato, Osaka (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 35 days.

(21) Appl. No.: 14/194,037

(22) Filed: Feb. 28, 2014

(65) Prior Publication Data

US 2015/0042929 A1 Feb. 12, 2015

(30) Foreign Application Priority Data

Aug. 6, 2013 (JP) .................. 2013-163263

(51) Int. Cl.
*G02F 1/1335* (2006.01)
*G02F 1/1333* (2006.01)
*G02F 1/1343* (2006.01)

(52) U.S. Cl.
CPC .... *G02F 1/133512* (2013.01); *G02F 1/133514* (2013.01); *G02F 2001/133388* (2013.01)

(58) Field of Classification Search
CPC .................... G02F 1/133512; G02F 1/133308; G02F 1/133608; G02F 1/13452; G02F 1/134363; G02F 1/133707; G02F 1/136213; G02F 1/133514; G02F 1/133516; G02F 1/133555; G02F 1/136209; G02F 2001/133308; G02B 5/201
USPC .................... 349/106, 58, 110, 141
See application file for complete search history.

(56) References Cited

U.S. PATENT DOCUMENTS

| | | | |
|---|---|---|---|
| 6,084,650 A | 7/2000 | Sekiguchi | |
| 6,529,255 B1 | 3/2003 | Sekiguchi | |
| 6,943,863 B2* | 9/2005 | Fujioka | G02F 1/1339 349/106 |
| 8,107,038 B2* | 1/2012 | Kim et al. | 349/106 |
| 2003/0086037 A1 | 5/2003 | Sekiguchi | |
| 2007/0291216 A1* | 12/2007 | Chan | G02F 1/1339 349/153 |
| 2013/0033654 A1 | 2/2013 | Kim et al. | |
| 2013/0278858 A1* | 10/2013 | Hashimoto | G02F 1/133512 349/58 |
| 2013/0335657 A1* | 12/2013 | Kira et al. | 349/41 |

FOREIGN PATENT DOCUMENTS

| | | |
|---|---|---|
| JP | 11-174465 | 7/1999 |
| JP | 2003-215556 | 7/2003 |
| JP | 2005-134934 | 5/2005 |
| JP | 2009-048178 | 3/2009 |
| JP | 2013-037364 | 2/2013 |

* cited by examiner

*Primary Examiner* — Mike Qi
(74) *Attorney, Agent, or Firm* — Hamre, Schumann, Mueller & Larson, P.C.

(57) ABSTRACT

Provided is a liquid crystal display device, including: a TFT substrate including a pixel electrode; a liquid crystal layer provided on the TFT substrate; and a color filter substrate provided on the liquid crystal layer. The color filter substrate includes a light non-transmitting layer made of a material that limits transmission of light. The light non-transmitting layer includes: a display region including a hole portion filled with a color resist that transmits light; and a frame-shaped non-display region surrounding the display region. The frame-shaped non-display region has a slit formed in one side thereof, along the one side, the slit passing through the light non-transmitting layer. The slit is filled with a member made of the same material as a material of the color resist.

7 Claims, 6 Drawing Sheets

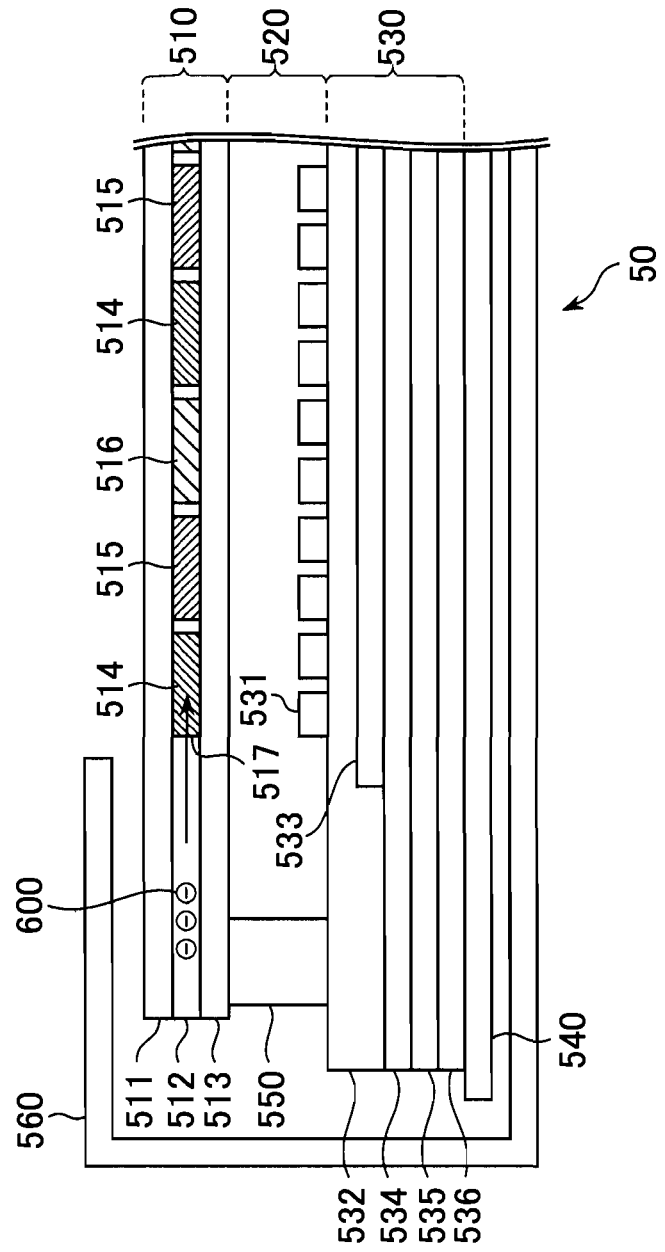
FIG.8 - Prior Art

LIQUID CRYSTAL DISPLAY DEVICE

CROSS-REFERENCE TO RELATED APPLICATION

The present application claims priority from Japanese application JP 2013-163263 filed on Aug. 6, 2013, the content of which is hereby incorporated by reference into this application.

TECHNICAL FIELD

The present invention relates to a liquid crystal display device.

BACKGROUND

A liquid crystal display device is a device configured to display an image on a display surface thereof in such a manner that transmission/non-transmission in a liquid crystal layer for light radiated from a backlight unit is controlled based on an electric field to be applied to the liquid crystal layer.

Japanese Patent Application Laid-open No. 2009-48178 discloses a liquid crystal display device in which a black matrix is formed on a color filter in a non-display region surrounding a display region. Japanese Patent Application Laid-open No. 2013-37364 discloses a liquid crystal display device in which a light blocking pattern formed by laminating color filter patterns is formed in a non-display region surrounding a display region.

FIG. 8 is a cross-sectional view illustrating an exemplary structure of a conventional-art liquid crystal display device 50. The liquid crystal display device 50 is a display device that performs display with an IPS (in-plane switching) mode. The liquid crystal display device 50 includes a color filter substrate 510, a liquid crystal layer 520, a TFT substrate 530, a backlight unit 540, a seal member 550, and a frame 560.

The TFT substrate 530 includes a pixel electrode 531, a protective insulating film 532, a common electrode 533, a gate insulating film 534, a gate wiring layer 535, and TFT glass 536.

The color filter substrate 510 includes color filter glass 511, a light non-transmitting layer 512, and a planarization film 513. In the light non-transmitting layer 512, hole portions 517 are formed in a matrix, for example, which are filled with any one of three kinds of color resists 514, 515, and 516 corresponding to red, green, and blue, respectively.

In the liquid crystal display device 50, the transmission/non-transmission of light in the liquid crystal layer 520 is controlled based on an electric field in the horizontal direction of FIG. 8, which is generated by a potential difference between the pixel electrode 531 and the common electrode 533. Then, light from the backlight unit 540 passing through the liquid crystal layer 520 further passes through the color resist 514, 515, or 516, thereby displaying an image on a display surface.

In this case, when an image is displayed on the liquid crystal display device 50, a signal for operating a transistor for controlling a potential of the pixel electrode 531 propagates through gate wiring formed on the gate wiring layer 535. When a pulse signal is applied to the gate wiring, electric charges 600 generated by wiring coupling in the gate wiring propagate through the light non-transmitting layer 512 as indicated by the arrow of FIG. 8, and an electric field is generated between the electric charges 600 and the pixel electrode 531. As described above, in the liquid crystal display device 50, an image is displayed by controlling the transmission/non-transmission of light in the liquid crystal layer 520 based on the electric field formed between the pixel electrode 531 and the common electrode 533. When the electric field formed between the electric charges 600 and the pixel electrode 531 is applied to the liquid crystal layer 520, the molecular orientation of the liquid crystal layer 520 is changed, with the result that an unintended display of color (discoloration) may occur in the display image.

The present invention has been made in view of the above-mentioned problem, and it is an object thereof to provide a liquid crystal display device in which a display image is less affected by the electric charges 600 generated by wiring coupling.

SUMMARY

In order to solve the above-mentioned problem, a liquid crystal display device according to one embodiment of the present invention includes: a TFT substrate including a pixel electrode; a liquid crystal layer provided on the TFT substrate; and a color filter substrate provided on the liquid crystal layer. The color filter substrate includes a light non-transmitting layer made of a material that limits transmission of light. The light non-transmitting layer includes: a display region including a hole portion filled with a color resist that transmits light; and a frame-shaped non-display region surrounding the display region. The frame-shaped non-display region has a groove formed in one side thereof, along the one side, the groove passing through the light non-transmitting layer. The groove is filled with a member made of the same material as a material of the color resist.

According to the embodiment of the present invention, the transfer of electric charges generated by wiring coupling is prevented by the groove formed in the light non-transmitting layer, thereby reducing an influence on a display image.

Further, according to one embodiment of the present invention, the TFT substrate further includes wiring connecting a transistor configured to control a potential of the pixel electrode and a driver circuit configured to drive the transistor to each other, and the one side is opposed to a region of the TFT substrate in which the wiring is formed.

According to the embodiment of the present invention, the display image is less affected by electric charges caused by the wiring formed in the region opposed to the one side in which the groove is formed.

Further, according to one embodiment of the present invention, the color resist that fills the hole portion of the display region includes a color resist that transmits light and emits blue color, and the member that fills the groove includes a portion made of the same material as a material of the color resist that emits blue color.

According to the embodiment of the present invention, light from a backlight unit passing through the groove is blue, and hence, when a region corresponding to the groove is visually recognized, display resulting from the light passing through the groove is not conspicuous.

Further, according to one embodiment of the present invention, the color resist that fills the hole portion of the display region includes a plurality of color resists that transmit light and emit a plurality of kinds of colors including blue, respectively, and the member that fills the groove is formed by overlapping a plurality of kinds of color resists including the color resist that emits blue color.

According to the embodiment of the present invention, color of light from the backlight unit passing through the groove is the mixture of a plurality of colors, and hence, when the region corresponding to the groove is visually recognized, display resulting from the light passing through the groove is not conspicuous.

Further, according to one embodiment of the present invention, the driver circuit is a circuit configured to supply a signal to a gate terminal of the transistor.

According to the embodiment of the present invention, the display image is less affected by electric charges caused by the gate signal.

Further, according to one embodiment of the present invention, the non-display region of the color filter is made of a light non-transmitting member, and a difference between a thickness of the member that fills the groove and a thickness of the color resist that fills the hole portion is equal to or less than a predetermined value.

According to the embodiment of the present invention, the increase in thickness of the liquid crystal display device due to the member filling the groove can be avoided.

Further, according to one embodiment of the present invention, the liquid crystal display device further includes a layer of a color resist formed at a predetermined position of the display region, the layer of the color resist having the same structure as a structure of the color resist that fills the groove.

According to the embodiment of the present invention, a spacer for maintaining a clearance between the color filter substrate and the TFT substrate is realized by the same structure as that of the layer of the color resist.

BRIEF DESCRIPTION OF THE DRAWINGS

FIG. 8 is a cross-sectional view illustrating an exemplary structure of a conventional-art liquid crystal display device.

DETAILED DESCRIPTION

Figure 1:
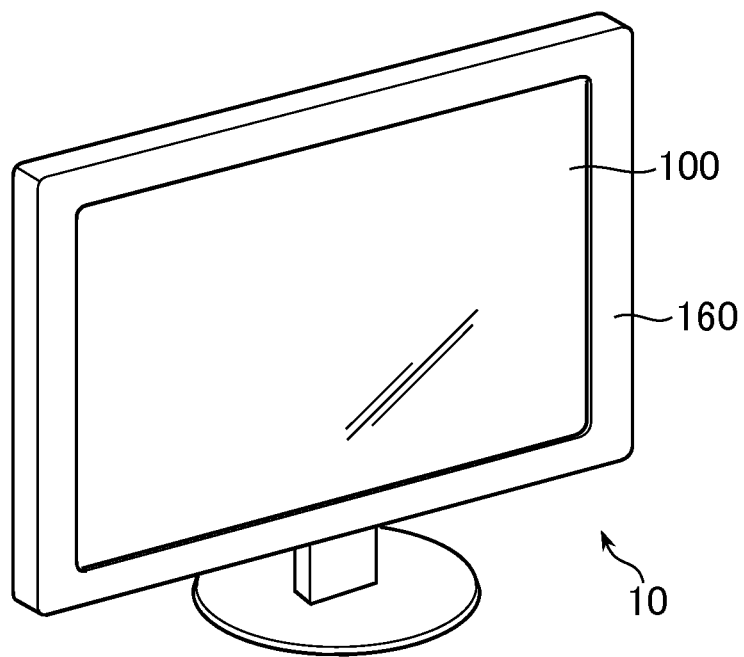
FIG. 1 is a view illustrating a liquid crystal display device according to one embodiment of the present invention.

FIG. 1 is a view illustrating a liquid crystal display device 10 according to one embodiment of the present invention. The liquid crystal display device 10 includes a frame 160 having a frame shape covering an outer periphery of a display surface 100.

Figure 2:
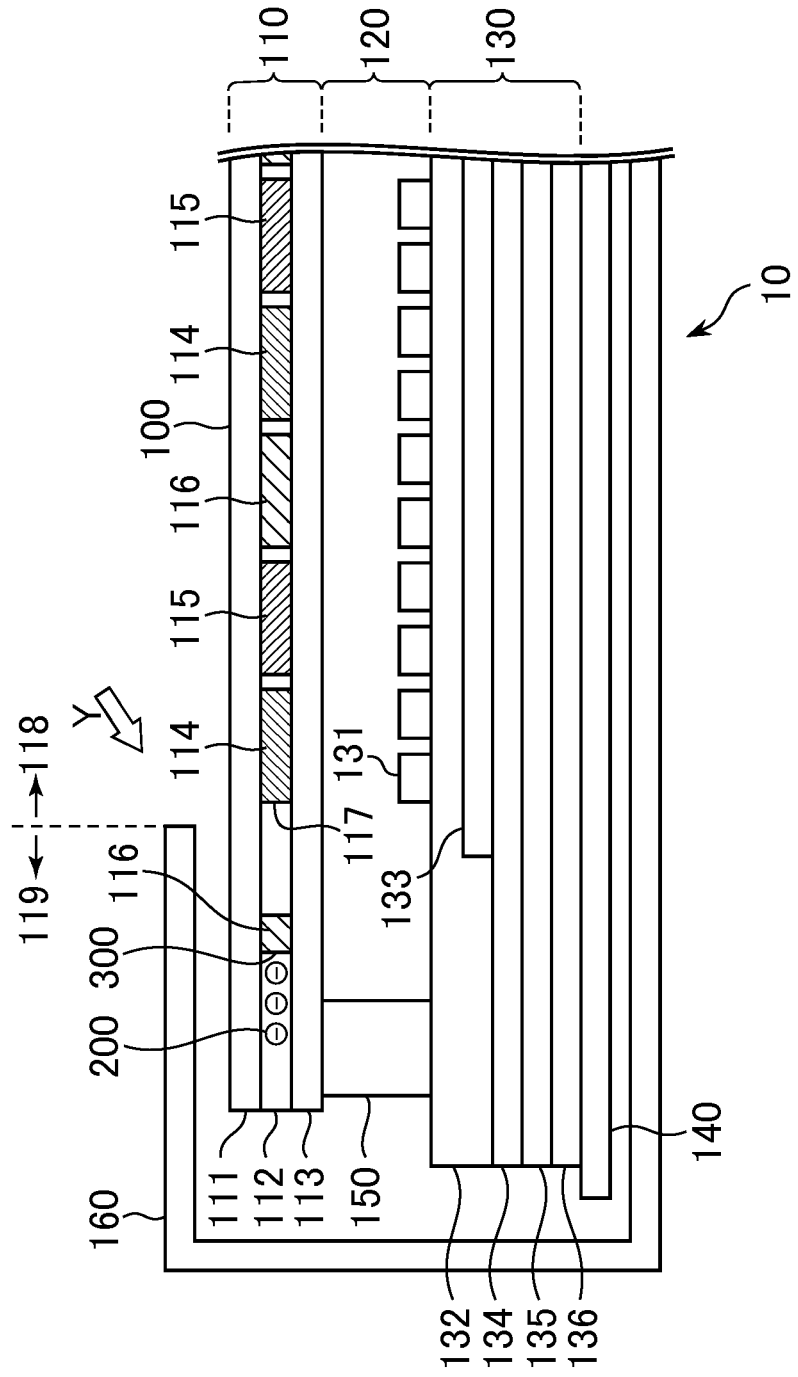
FIG. 2 is a cross-sectional view illustrating a structure of the liquid crystal display device according to one embodiment of the present invention.

FIG. 2 is a cross-sectional view illustrating a structure of the liquid crystal display device 10 according to one embodiment of the present invention. The liquid crystal display device 10 is a display device that performs display with an IPS (in-plane switching) mode. The liquid crystal display device 10 includes a color filter substrate 110, a liquid crystal layer 120, a TFT substrate 130, a backlight unit 140, a seal member 150, and a frame 160.

The TFT substrate 130 includes a pixel electrode 131, a protective insulating film 132, a common electrode 133, a gate insulating film 134, a gate wiring layer 135 including gate wiring 137 for supplying a gate signal to a transistor for controlling a potential of the pixel electrode 131, and TFT glass 136.

In the liquid crystal display device 10, the liquid crystal layer 120 has a thickness of 2.5 μm to 4.0 μm, the protective insulating film 132 has a thickness of 0.2 μm to 0.5 μm, the gate insulating film 134 has a thickness of 0.2 μm to 0.4 μm, the gate wiring layer 135 has a thickness of 0.2 μm to 0.4 μm, and the TFT glass 136 has a thickness of 0.7 mm or less.

The color filter substrate 110 includes color filter glass 111, a light non-transmitting layer 112, and a planarization film 113. The light non-transmitting layer 112 includes a layer made of a non-transmitting member that limits the transmission of light, in which hole portions 117 that are filled with any one of three kinds of color resists 114, 115, and 116 for transmitting light and emitting red, green, and blue colors, respectively, are formed in a matrix, for example.

In the liquid crystal display device 10, the transmission/non-transmission of light in the liquid crystal layer 120 is controlled based on an electric field in the horizontal direction of FIG. 2, which is generated by a potential difference between the pixel electrode 131 and the common electrode 133. Then, light from the backlight unit 140 passing through the liquid crystal layer 120 further passes through the color resist 114, 115, or 116, thereby displaying an image on the display surface 100.

In this case, in the light non-transmitting layer 112, the non-transmitting portion has a thickness of 1 μm to 1.5 μm, and the portion of the color resists 114, 115, and 116 has a thickness of 2.5 μm to 3.5 μm. The planarization film 113 has a thickness of 1 μm to 2.5 μm.

Figure 3:
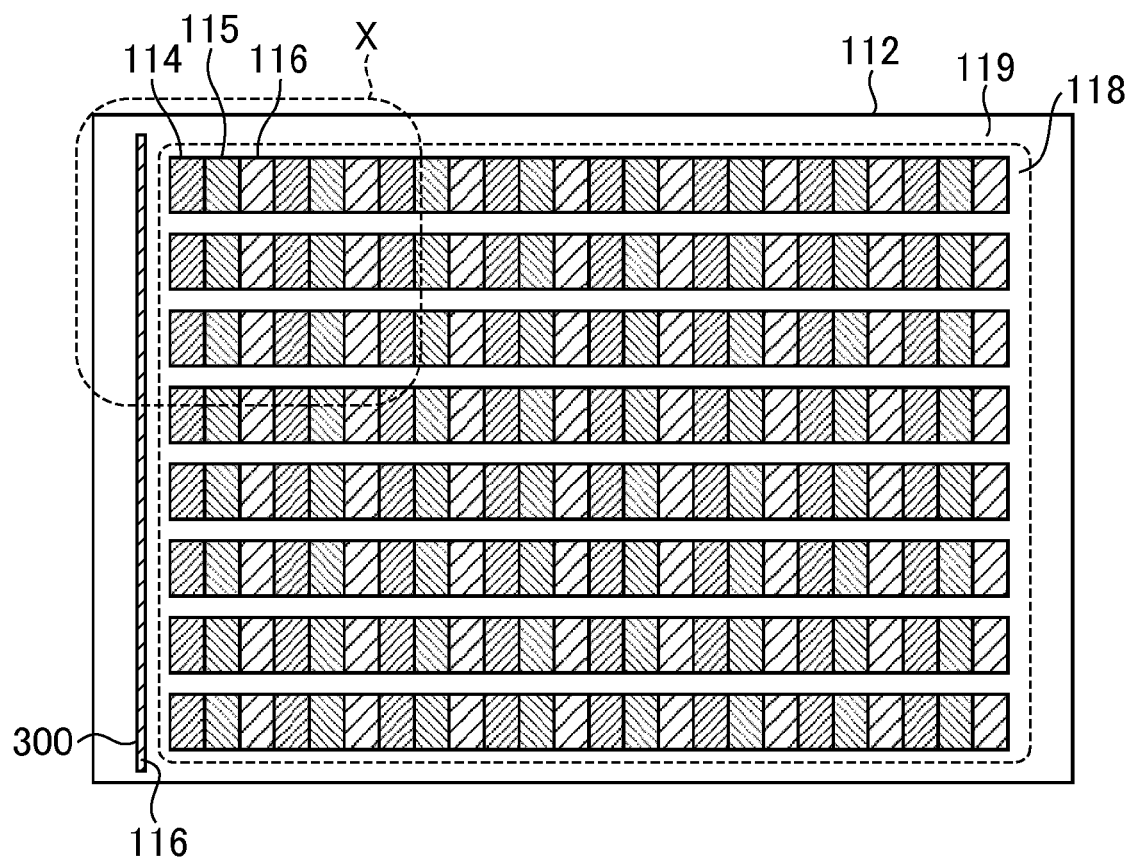
FIG. 3 is a view illustrating a surface of a light non-transmitting layer of the liquid crystal display device according to one embodiment of the present invention.
Figure 4:
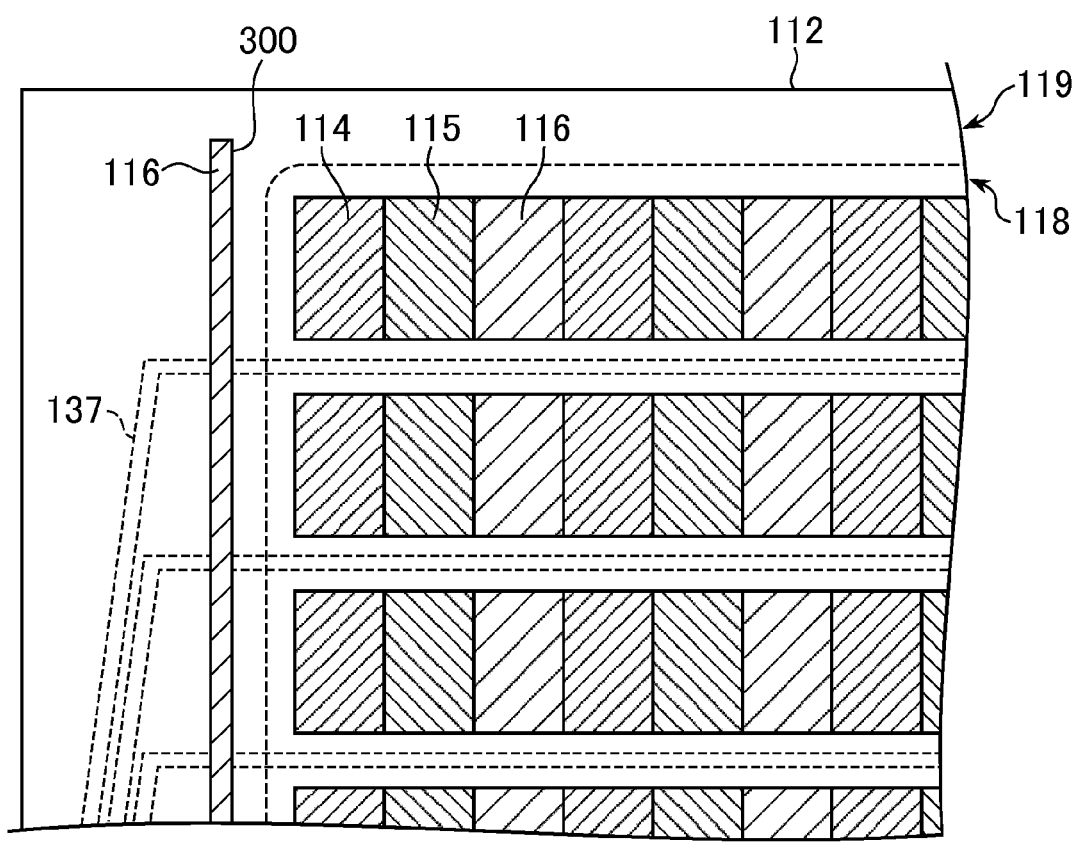
FIG. 4 is an enlarged view of a region X of FIG. 3.

FIG. 3 is a view illustrating a surface of the light non-transmitting layer 112 of the liquid crystal display device 10 according to one embodiment of the present invention. The light non-transmitting layer 112 includes a display region 118 for transmitting light to display an image, and a non-display region 119 having a frame shape surrounding the display region 118. In the liquid crystal display device 10, the non-display region 119 is covered by the frame 160. FIG. 4 is an enlarged view of a region X of FIG. 3.

A slit (groove) 300 passing through the light non-transmitting layer 112 is formed in one side of the frame-shaped non-display region 119 that is opposed to a region on the gate wiring layer 135 in which the gate wiring 137 is formed. Further, the slit 300 is filled with a color resist 116 made of the same material of the color resist 116 that fills the hole portion 117 and emits blue color.

In this case, the volume resistivity of a resin-based material for forming the light non-transmitting layer 112 is about $3.6 \times 10^{11}$ $\Omega/cm^3$, the volume resistivity of the color resist 116 is about $2.3 \times 10^{15}$ $\Omega/cm^3$, and the volume resistivity of the planarization film 113 is about $1.2 \times 10^{15}$ $\Omega/cm^3$.

When an image is displayed on the liquid crystal display device 10 according to the present invention, a gate signal to be input to a transistor for controlling a potential of the pixel electrode 131 propagates through the gate wiring 137 on the gate wiring layer 135. When a pulse signal is applied to the gate wiring 137, electric charges 200 are generated by wiring coupling in the gate wiring 137. However, because of the presence of the slit 300 filled with the color resist 116 having high electric resistance, the electric charges 200 are prevented from propagating to the display region 118. Consequently, a display image is not affected by the electric charges 200.

In addition, in the liquid crystal display device 10, because the slit 300 is filled with the color resist 116, light passing through the slit 300 is blue. Thus, for example, when a viewer approaches the display surface to visually recognize the non-display region 119 with the line of sight in the direction of the arrow Y of FIG. 2, the light passing through the slit 300 is not conspicuous.

Further, the color resist 116 in the slit 300 has the same structure as that of the color resist 116 filling the hole portion 117 within the display region, and is formed in the identical step to the step of filling the hole portion 117 with the color resist 116. Consequently, the liquid crystal display device 10 including the slit 300 filled with the color resist 116 according to the present invention can be manufactured in the same steps as those of the conventional-art liquid crystal display device, that is, without adding an additional step.

With the structure described above, the liquid crystal display device 10 in which a display image is less affected by the electric charges 200 generated by wiring coupling can be provided.

Note that, the above-mentioned embodiment shows the structure in which the slit 300 is filled with the color resist 116 for emitting blue color, but the present invention is not limited thereto. The slit 300 may be filled with the color resist 114 or the color resist 115 for emitting another color, or a plurality of kinds of color resists may be overlapped with one another.

Figure 5:
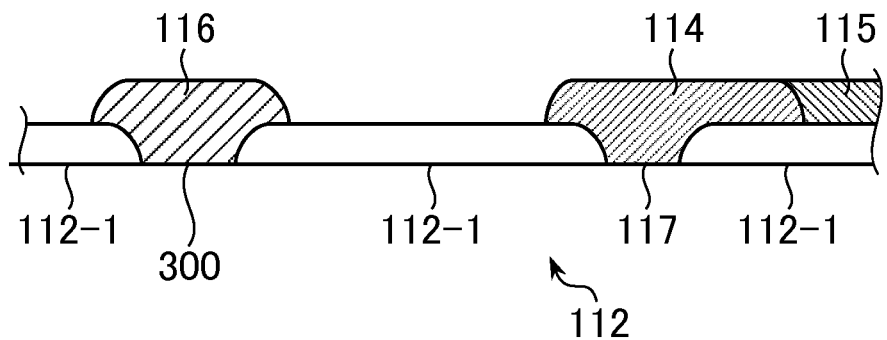
FIG. 5 is a view illustrating an exemplary structure of the light non-transmitting layer of a color filter substrate according to one embodiment of the present invention.
Figure 6:
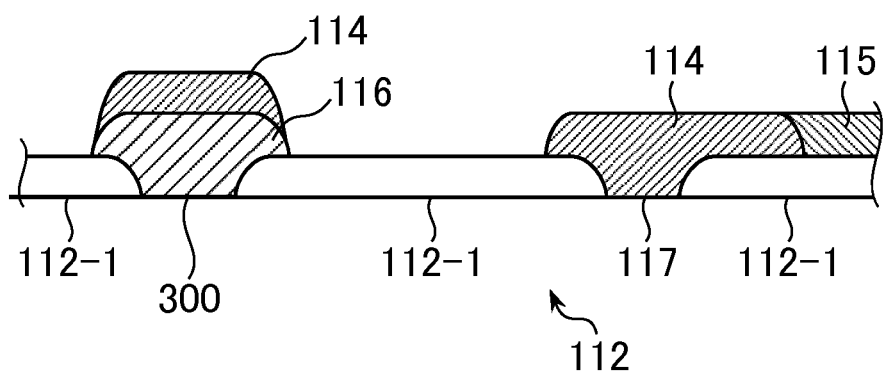
FIG. 6 is a view illustrating another exemplary structure of the light non-transmitting layer of the color filter substrate according to one embodiment of the present invention.
Figure 7:
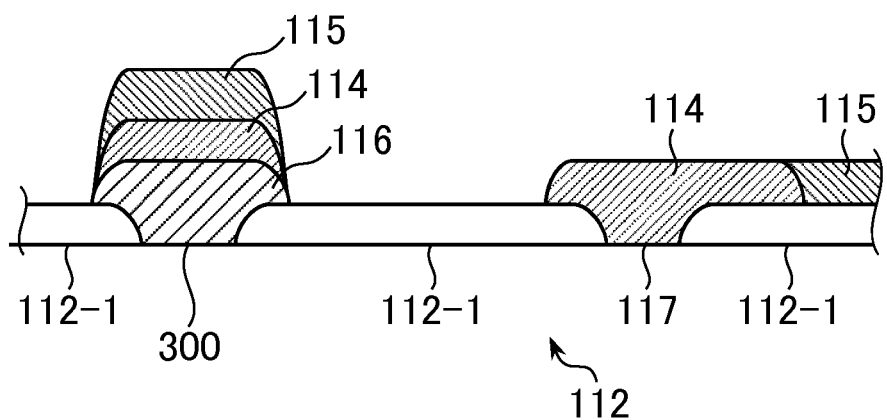
FIG. 7 is a view illustrating another exemplary structure of the light non-transmitting layer of the color filter substrate according to one embodiment of the present invention.

FIGS. 5 to 7 are views illustrating exemplary structures of the light non-transmitting layer 112 of the color filter substrate 110 according to one embodiment of the present invention.

FIG. 5 is a view illustrating the structure of the light non-transmitting layer 112 according to the above-mentioned embodiment. The light non-transmitting layer 112 includes the hole portion 117 and the slit 300 that pass through a light non-transmitting member 112-1. The hole portion 117 is filled with the color resist 114 corresponding to red, and the slit 300 is filled with the color resist 116 corresponding to blue.

FIG. 6 is a view illustrating the structure of the light non-transmitting layer 112 according to another embodiment of the present invention. Similarly to FIG. 5, the light non-transmitting layer 112 includes the hole portion 117 and the slit 300 that pass through the light non-transmitting member 112-1. The hole portion 117 is filled with the color resist 114 corresponding to red, and the slit 300 is filled with the color resist 116 corresponding to blue. Further, the color resist 116 is overlapped with the color resist 114 corresponding to red. In this structure, light passing through the slit 300 is violet light in mixed color of red and blue, and further, the light is reduced in brightness as compared to the passing light of FIG. 5 because the layer thickness of the color resists is larger. Consequently, the light is much less conspicuous.

FIG. 7 is a view illustrating the structure of the light non-transmitting layer 112 according to another embodiment of the present invention. Similarly to FIGS. 5 and 6, the light non-transmitting layer 112 includes the hole portion 117 and the slit 300 that pass through the light non-transmitting member 112-1. The hole portion 117 is filled with the color resist 114 corresponding to red, and the slit 300 is filled with the color resist 116 corresponding to blue. Further, the color resist 116 is overlapped with the color resist 114 corresponding to red and the color resist 115 corresponding to green. In this structure, light passing through the slit 300 is black light in mixed color of red, blue, and green, and further, the light is reduced in brightness as the passing light of FIGS. 5 and 6 because the layer thickness of the color resists is larger. Consequently, the light is much less conspicuous.

Although the present invention has been described above by way of the embodiments, it should be understood that the present invention may encompass various structures with modifications within the range not departing from the gist thereof.

For example, the above-mentioned respective embodiments show the structure in which the slit 300 is formed in the side opposed to the region in which the gate wiring 137 is formed. Alternatively, however, the slit 300 may be formed in a side opposed to wiring for propagating another signal. Further, the shape of the slit 300 is not limited thereto as long as the propagation of the electric charges 200 can be prevented.

Further, the above-mentioned respective embodiments show the mode in which the slit 300 is filled with the color resists 114, 115, and 116 in the identical step to the step of filling the hole portion 117 with the color resists 114, 115, and 116, that is, the structure in which the respective thicknesses of the color resists 114, 115, and 116 in the slit 300 are equal to the respective thicknesses of the color resists 114, 115, and 116 in the hole portion 117 (the difference therebetween is equal to or less than a predetermined value), but the present invention is not limited thereto. For example, the color resists 114, 115, and 116 in the slit 300 may be formed with the use of a half-tone mask so as to be thinner than the color resists 114, 115, and 116 formed in the hole portion 117, to thereby thin the layer of the color resists in the slit 300. For example, by setting the difference between the thickness of the layer of the color resists in the slit 300 and the thicknesses of the color resists 114, 115, and 116 filling the hole portion 117 to be equal to or less than a predetermined value, the above-mentioned effect can be obtained without increasing the thickness of the liquid crystal display device 10.

Further, when the layer of the color resists is formed to be thicker than the light non-transmitting member 112-1 as illustrated in FIGS. 5 to 7, the same structure as that of the layer of the color resists may be formed at a predetermined position of the display region 118 in the identical step to the step of forming the layer of the color resists, and the structure formed on the display region 118 may be used as a spacer for maintaining a space between the color filter substrate 110 and the protective insulating film 132.

While there have been described what are at present considered to be certain embodiments of the invention, it will be understood that various modifications may be made thereto, and it is intended that the append claims cover all such modifications as fall within the true spirit and scope of the invention.

What is claimed is:

1. A liquid crystal display device, comprising:
   a TFT substrate comprising a pixel electrode;
   a liquid crystal layer provided on the TFT substrate; and
   a color filter substrate provided on the liquid crystal layer,
   wherein the color filter substrate comprises a light non-transmitting layer made of a material that limits transmission of light,
   wherein the light non-transmitting layer includes:
      a display region including a hole portion filled with a color resist that transmits light; and
      a frame-shaped non-display region surrounding the display region,
   wherein the frame-shaped non-display region has a groove formed in one side thereof, along the one side, to a laterally interior side of a seal member, the groove passing through the light non-transmitting layer, and
   wherein the groove is filled with a member made of the same material as a material of the color resist.

2. The liquid crystal display device according to claim 1,
wherein the TFT substrate further comprises wiring connecting a transistor that controls a potential of the pixel electrode and a driver circuit that drive the transistor to each other, and
wherein the one side is opposed to a region of the TFT substrate in which the wiring is formed.

3. The liquid crystal display device according to claim 1,
wherein the color resist that fills the hole portion of the display region comprises a blue color resist that transmits light and emits blue color, and
wherein the member that fills the groove comprises a portion made of the same material as a material of the blue color resist that emits blue color.

4. The liquid crystal display device according to claim 3,
wherein the color resist that fills the hole portion of the display region comprises a plurality of color resists that transmit light and emit a plurality of kinds of colors including blue, respectively, and
wherein the member that fills the groove is formed by overlapping a plurality of kinds of color resists including the blue color resist that emits blue color.

5. The liquid crystal display device according to claim 1,
wherein the driver circuit is a circuit that supplies a signal to a gate terminal of the transistor.

6. The liquid crystal display device according to claim 1,
wherein the non-display region of the color filter is made of a light non-transmitting member, and
wherein a difference between a thickness of the member that fills the groove and a thickness of the color resist that fills the hole portion is equal to or less than a predetermined value.

7. The liquid crystal display device according to claim 1,
further comprising a layer of a color resist formed at a predetermined position of the display region, the layer of the color resist having the same structure as a structure of the color resist that fills the groove.

* * * * *